United States Patent Office 3,804,873
Patented Apr. 16, 1974

3,804,873
PROCESS FOR MANUFACTURING A LIQUID THIOCARBAMATE
William C. Doyle, Jr., Leawood, Kans., assignor to Gulf Research & Development Company, Pittsburgh, Pa.
No Drawing. Filed Mar. 18, 1971, Ser. No. 125,794
Int. Cl. C07c 155/06
U.S. Cl. 260—455 A    4 Claims

ABSTRACT OF THE DISCLOSURE

Liquid thiocarbamates are manufactured by a procedure in which the thiocarbamate ester product serves as a reaction promoting solvent in the reaction of a mercaptan with phosgene to produce a chlorothioformate ester, which is then reacted with a secondary or tertiary amine to yield the desired thiocarbamate ester. A portion of the thiocarbamate ester product is recycled to the initial reaction step as a reaction promoting solvent.

DESCRIPTION OF THE INVENTION

The reaction of an alkyl mercaptan with phosgene is the classical method of preparing an alkyl chlorothioformate, having been first reported in 1873 (J. Prakt. Chemie [2], 7, 252). This reaction presents a problem in that it goes to completion so slowly that several days must be allowed for this to occur. The use of various substances as catalysts for the reaction is proposed in prior patents. For example, in U.S. 3,165,544, U.S. 3,277,143 and U.S. 3,299,114, the proposed catalysts embrace substances which may be classified as adsorbents, solvents and nitrogen bases. Regardless of the type of substance used as a catalyst, the prior art catalysts are without exception substances which are foreign to either the reagents or the products of reaction and therefore make the process more complicated, requiring removal or recovery at some stage in order to obtain final products which are free of contamination.

The accelerating effect of specific solvents on certain reactions which otherwise are rather slow has been given considerable study, particularly during about the last decade. The types of solvents which exert these influences and the mechanisms of the accelerating effects, however, remain inadequately classified and theory in this field is not yet well enough developed so that an expected effect of a specific solvent can be predicted with reliability. So far studies in this field have been limited to a comparatively small group of reactions and a rather small number of solvents. This subject is reviewed in Chemical Reviews, v. 69, No. 1, pp. 1–32.

I have discovered that the reaction of a mercaptan with phosgene is promoted by liquid S-alkyl N,N-disubstituted thiocarbamates. This is fortuitous because the chlorothiolformate ester so produced is then used in turn to manufacture a liquid thiocarbamate ester. Thus by selecting as reaction promoting solvent the same thiocarbamate ester which is desired as the final product of my process, it is possible to operate the process without adding foreign substances which are neither reagents nor products.

Briefly my invention consists of a process for manufacturing a liquid thiocarbamate ester having the formula

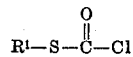

in which $R^1$ represents an alkyl group having from 1 to 4 carbon atoms and $R^2$ and $R^3$ represent alkyl or cycloalkyl groups, alike or unlike, each having from 1 to 6 carbon atoms or $R^2$ and $R^3$ together may consist of a chain of 4 to 6 methylene groups, comprising the steps:

(a) reacting a mercaptan having the formula $R^1SH$ with phosgene in the presence of a substantial quantity of the thiocarbamate ester sufficient to promote the reaction, thereby obtaining a reaction product mixture containing the chlorothiolformate ester having the structural formula

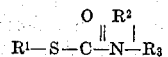

as principal reaction product, (b) reacting a secondary or tertiary amine with the chlorothiolformate ester obtained in step (a) to yield a product mixture from which the thiocarbamate ester is recovered as principal reaction product, (c) recycling to step (a) a portion of the thiocarbamate ester product obtained in step (b).

The process is illustrated by means of the following specific examples.

EXAMPLE 1

In a laboratory scale operation of a specific embodiment of the invention a 500 ml. round bottom flask is fitted with a thermometer, gas delivery tube with porous fritted glass tip, magnetic stirrer and Dry-Ice cooled condenser. The outlet of the condenser is connected to a tube which has an open end that dips a few millimeters below the surface of a stirred 10 percent aqueous solution of sodium hydroxide.

Step (a)

The reaction flask is charged with 62 g. (1.0 mol) of ethyl mercaptan and 48 g. (0.3 mol) of S-ethyl N,N-diethylthiocarbamate. Phosgene is slowly passed into the flask through the gas delivery tube while maintaining the reaction temperature between 0° and 20° C., preferably between 5° and 7° C. by cooling with an ice bath surrounding the reaction flask.

After about 3.5 hours phosgene begins refluxing in the condenser, indicating that an excess of this reagent is present and reaction is substantially completed. At this point the net weight gain in the reaction mixture is about 82 g. Addition of phosgene is then stopped, the mixture is stirred for one hour at 15° C., then is warmed slowly to 70 to 75° C., and is subjected to reduced pressure by means of a water aspirator for 5 to 10 minutes to remove volatile by-products. The reaction product mixture which remains is a clear amber liquid (165 g.) containing S-ethyl N,N-diethylthiocarbamate and about 117 g. (94% conversion) of ethyl chlorothiolformate which can be isolated, if desired, by distillation.

In separate experiments, amount of thiocarbamate ester, temperature and reaction time in this step were varied, as shown in the data which appear in Table I.

TABLE I

| Experiment No. | EtSH, mols | S-ethyl N,N-diethylthio-carbamate, mols | COCl$_2$ addition time (hrs.) | Temp., °C. | Percent yield |
|---|---|---|---|---|---|
| 1 | 1.0 | 0.05 | 1¾ | 15–20 | 42 |
| 2 | 1.0 | 0.2 | 2½ | 20–25 | 87 |
| 3 | 1.0 | 0.3 | 3½ | 5–7 | 94 |
| 4 | 1.0 | 0.4 | 2 | 7–15 | 90 |
| 5 | 0.5 | 0.31 | ¾ | 5–20 | 90 |

It can be seen from these data that the promoting effect was apparently most pronounced when from about 0.3 mol to about 0.6 mol of alkyl dialkylthiocarbamate was used per mol of mercaptan and the reaction temperature was from about 5 to about 20° C. This investigation showed that the reaction is apparently accelerated in proportion to the amount of thiocarbamate ester present. In experiment No. 5 the phosgene appeared to react as fast as it was introduced into the reactor. In experiments No. 1 and 2 in which the mol ratios of thiocarbamate to mercaptan were 0.05 and 0.2 respectively, unreacted phosgene refluxed in the condenser when the temperature was above about 8° C. Providing sufficient heat exchange capacity is employed to absorb the heat of reaction, the process may be operated with high throughput rates and at ambient temperature. Preferably the reaction temperature is not allowed to exceed the boiling point of either the mercaptan or the thiocarbamate ester product, so as to avoid the expense of constructing a reactor which will withstand superatmospheric pressures.

There is no particular advantage to be gained in use of large amounts of thiocarbamate ester beyond the amount necessary to accelerate the reaction, since this merely takes up space in the reactor and reduces effective capacity. The increase in overall volume of the reaction mixture may in some instances facilitate temperature control but a heat exchange jacket or internal cooling coils can be of adequate capacity so that use of large volumes of thiocarbamate ester is unnecessary.

The selection of operating temperature range and amount of thiocarbamate ester should be an economical compromise. A preferred set of conditions, for example, employs about 0.3 to 0.4 mol of thiocarbamate per mol of mercaptan in a stirred reactor with sufficient cooling capacity so that the temperature is held near ambient room temperature, ranging from about 20 to 30° C. This set of conditions requires a minimum of reflux capacity to prevent unreacted phosgene from leaving the reactor and permits efficient utilization of reactor space. Following reaction, it is desirable to remove hydrogen chloride by reduced pressure evaporation. Otherwise the hydrogen chloride will consume part of the amine employed as a reagent in step (b).

Step (b)

To 222 g. (2.2 mols) of triethylamine is added 342 g. of the reaction product mixture obtained in step (a) containing 230 g. (1.85 mols) of ethyl chlorothiolformate and 112 g. of S-ethyl N,N-diethylthiocarbamate. The mixture so obtained is heated and stirred at 80° C. for 4 hours, washed with three 500 ml. portions of water and volatile impurities are removed by evaporation under reduced pressure obtained with a cold water aspirator. The resulting product is about 381 g. of S-ethyl N,N-diethylthiocarbamate of about 95% purity.

This step may be operated with the use of either a secondary or tertiary amine as reagent. Although tertiary amines permit use of a simpler recovery procedure and in this respect are preferred, the use of secondary amines is an older and more familiar procedure.

Step (c)

A sufficient quantity of the S-ethyl N,N-diethylthiocarbamate product obtained in step (b) is recycled to step (a) to serve as reaction-promoting solvent.

EXAMPLE 2

In this example, step (a) is carried out in the same manner as in Example 1, except that about .3 mole of S-ethyl N,N-dipropylthiocarbamate per mol of ethyl mercaptan is used as reaction-promoting solvent. In step (b) the product mixture from step (a) is heated to 90° C. over a period of 3 hours with about 2 mols of tripropylamine per mol of ethyl chlorothiolformate present in the mixture. This reaction mixture is maintained at 95 to 105° C. for an additional 8 hours, chilled in an ice bath, diluted with hexane and filtered to recover precipitated tripropylamine hydrochloride. The filtrate is then concentrated in a rotary evaporator in a 60° C. water bath, removing hexane and a major portion of the unreacted tripropylamine. The concentrated solution is then distilled in a short Vigreaux column to yield S-ethyl N,N-dipropylthiocarbamate in better than 90 percent purity, B.P. at 11 mm., 110–112° C. A portion of the product is then recycled to step (a) to serve as reaction-promoting solvent.

EXAMPLE 3

In this example, step (a) is carried out in the same manner as Example 1. In step (b) a quantity of reaction product mixture obtained in step (a) containing 79 g. (0.64 mol) of ethyl chlorothiolformate and 48 g. of S-ethyl N,N-diethylthiolcarbamate is added slowly to 92 g. (1.26 mols) of diethylamine in 75 ml. of benzene with stirring and external cooling with an ice bath. The mixture is then stirred one hour at room temperature. The reaction mixture is then washed with two 200 ml. portions of water and 50 ml. of saturated sodium chloride solution. The mixture is then evaporated under reduced pressure from a cold water aspirator to remove benzene and volatile impurities. The remainder is 115 g. of S-ethyl-N,N-diethyl thiocarbamate of about 95% purity.

In step (c) a portion of the S-ethyl N,N-diethylthiocarbamate produced in step (b) is recycled to step (a) as reaction promoting solvent.

Use of both secondary and tertiary amines in step (b) is illustrated in the specific examples, either type may be used, depending upon personal choice or availability of raw materials. A great variety of amines may be employed including, for example, dipropylamine, diisobutylamine, butylethylamine, cyclohexylethylamine and hexamethyleneimine. Step (a) also is apparently quite adaptable to the use of a wide variety of liquid thiocarbamates as reaction promoters, including compounds having unsymmetrical substitution, as for example, S-ethyl N-cyclohexyl-N-ethylthiocarbamate or S-propyl N-butyl-N-ethylthiocarbamate. If the chlorothiolformate is desired for use for some other purpose, a thiocarbamate promoter may be selected on the basis of boiling point, freezing point or other physical characteristics which will facilitate product separation and purification. So long as sufficient thiocarbamate is used to accelerate the reaction of mercaptan with phosgene so that it may be carried on at room temperature, interfering side reactions are substantially eliminated.

I claim:

1. The process for manufacturing S-ethyl N,N-diethylthiocarbamate comprising the steps:
   (a) reacting ethyl mercaptan with phosgene in the presence of a substantial quantity of S-ethyl N,N-diethylthiocarbamate, at least 0.2 mol per mol of mercaptan, sufficient to promote the reaction, thereby obtaining a reaction product mixture containing ethyl chlorothiolformate as principal reaction product,
   (b) reacting triethylamine with the ethyl chlorotriolformate product obtained in step (a) to yield a reaction product mixture from which S-ethyl N,N-diethylthiocarbamate is recovered as principal reaction product, and
   (c) recycling to step (a) a portion of the S-ethyl N,N-diethylthiocarbamate obtained in step (b).

2. The process for manufacturing S-ethyl N,N-dipropylthiocarbamate comprising the steps:
   (a) reacting ethyl mercaptan with phosgene in the presence of a substantial quantity of the S-ethyl N,N-dipropylthiocarbamate, at least 0.2 mol per mol of mercaptan, sufficient to promote the reaction, thereby obtaining a reaction product mixture containing ethyl chlorothiolformate as principal reaction product,
   (b) reacting tripropylamine with the ethyl chlorothiolformate obtained in step (a) to yield a reaction product mixture from which S-ethyl N,N-dipropylthiocarbamate is recovered as principal reaction product, and
   (c) recycling to step (a) a portion of the S-ethyl N,N-dipropylthiocarbamate obtained in step (b).

3. In a process for manufacturing S-ethyl N,N-diethylthiocarbamate as set forth in claim 1, the step of reacting ethyl mercaptan with phosgene in the presence of a reaction-promoting amount, about 0.3 to 0.4 mol per mol of ethyl mercaptan, of liquid S-ethyl N,N-diethylthiocarbamate.

4. In a process for manufacturing S-ethyl N,N-dipropylthiocarbamate as set forth in claim 2, the step of reacting ethyl mercaptan with phosgene in the presence of a reaction-promoting amount, about 0.3 to 0.4 mol per mol of ethyl mercaptan, of liquid S-ethyl N,N-dipropylthiocarbamate.

References Cited

UNITED STATES PATENTS

| | | | |
|---|---|---|---|
| 3,267,124 | 8/1966 | Nyquist | 260—455 A |
| 2,863,899 | 12/1958 | Harris | 260—455 A |
| 3,609,175 | 9/1971 | Richter | 260—455 A |
| 3,185,720 | 5/1965 | Tilles et al. | 260—455 A |
| 3,299,114 | 1/1967 | Tilles | 260—455 A |
| 2,509,483 | 5/1950 | Crouch | 260—455 R |
| 3,379,750 | 4/1968 | Kollonitsch | 260—455 A |
| 3,165,544 | 1/1965 | Tilles | 260—455 R |
| 3,277,143 | 10/1966 | Tilles | 260—455 R |

GLENNON H. HOLLRAH, Primary Examiner

U.S. Cl. X.R.

260—239 BF, 293.85, 326.82, 455 R